United States Patent
Wakode et al.

(10) Patent No.: US 12,311,746 B2
(45) Date of Patent: May 27, 2025

(54) ELECTRIC AXLE AND CONTROL METHOD

(71) Applicant: Dana Heavy Vehicle Systems Group, LLC, Maumee, OH (US)

(72) Inventors: Anand Wakode, Pune (IN); Saket Kale, Pune (IN)

(73) Assignee: DANA HEAVY VEHICLE SYSTEMS GROUP, LLC, Maumee, OH (US)

(*) Notice: Subject to any disclaimer, the term of this patent is extended or adjusted under 35 U.S.C. 154(b) by 136 days.

(21) Appl. No.: 18/151,294

(22) Filed: Jan. 6, 2023

(65) Prior Publication Data
US 2024/0227530 A1 Jul. 11, 2024

(51) Int. Cl.
| B60K 1/02 | (2006.01) |
| B60K 17/16 | (2006.01) |
| B60L 15/20 | (2006.01) |
| F16H 48/00 | (2012.01) |
| B60K 1/00 | (2006.01) |

(52) U.S. Cl.
CPC ............... B60K 1/02 (2013.01); B60K 17/16 (2013.01); *B60K 2001/001* (2013.01); *F16H 2048/02* (2013.01)

(58) Field of Classification Search
CPC ... B60K 1/00; B60K 1/02; B60K 1/16; B60K 2001/001; F16H 3/54; F16H 2200/0021; F16H 2200/0034; B60L 15/20; B60L 15/2009; B60Y 2200/91
See application file for complete search history.

(56) References Cited

U.S. PATENT DOCUMENTS

| 5,289,890 | A  | * | 3/1994  | Toyoda ................... B60L 50/61 318/432 |
| 7,353,895 | B2 |   | 4/2008  | Bitsche et al. |
| 8,177,007 | B2 |   | 5/2012  | Abe et al. |
| 8,536,743 | B2 |   | 9/2013  | Kasuya et al. |
| 9,764,631 | B2 | * | 9/2017  | Kim .......................... B60K 6/36 |
| 11,198,367 | B2 |   | 9/2021  | Habata et al. |
| 11,407,307 | B2 | * | 8/2022  | Lorenz .................... F16H 48/42 |
| 2013/0345019 | A1 | * | 12/2013 | Kaltenbach ............ B60K 6/547 903/902 |
| 2015/0021109 | A1 | * | 1/2015  | Knoblauch ............ B60K 17/12 475/150 |
| 2019/0077247 | A1 | * | 3/2019  | Schwekutsch ......... B60K 17/34 |
| 2021/0291643 | A1 | * | 9/2021  | Marechal ............... B60K 17/16 |

FOREIGN PATENT DOCUMENTS

| CN | 109866613 | A  | * | 6/2019  | ............... B60K 1/02 |
| DE | 102011005451 | A1 | * | 9/2012  | ............... B60K 6/387 |
| DE | 102016218717 | B3 | * | 2/2018  | ............... B60K 1/02 |
| DE | 202019103781 | U1 |   | 10/2020 | |

(Continued)

*Primary Examiner* — Tinh Dang
(74) *Attorney, Agent, or Firm* — McCoy Russell LLP

(57) ABSTRACT

Systems and methods for an electric axle. In one example, the electric axle includes an electric machine removably coupled to a first side of an input shaft via a first mechanical attachment interface and a differential rotationally coupled to a transmission. The transmission includes the input shaft that includes a second mechanical interface on a second side that is opposite the first side and a clutch mounted on an intermediate shaft or the input shaft and configured to shift the transmission between at least two gear ratios.

19 Claims, 10 Drawing Sheets

(56) References Cited

FOREIGN PATENT DOCUMENTS

| EP | 3587157 | A1 | | 1/2020 | |
|----|---------|----|----|--------|----|
| FR | 2930743 | A1 | * | 11/2009 | ............... B60K 1/02 |
| FR | 2976526 | A1 | | 12/2012 | |
| JP | 5287576 | B2 | * | 9/2013 | |
| WO | 2017202031 | A1 | | 11/2017 | |
| WO | 2022023303 | A1 | | 2/2022 | |
| WO | WO-2023000979 | A1 | * | 1/2023 | |

\* cited by examiner

ELECTRIC AXLE AND CONTROL METHOD

TECHNICAL FIELD

The present disclosure relates to an electric axle with an input shaft that is configured to attach to electric machines on opposing sides.

BACKGROUND AND SUMMARY

Electric vehicles make use of electric drive units to generate motive power and provide an attractive alternative in terms of hydrocarbon emissions in relation to vehicles that solely rely on internal combustion engines for propulsion. Certain vehicles have made use of electric drive axles due to the lower amount of design effort needed to incorporate the electric axles into the vehicles when compared to electric drive units that are spaced away from the axles, in some cases.

EP 3587157 B1 to Schneider et al. discloses an electric drive unit which includes multiple motors that are positioned in front of and behind an axle shaft. Schneider's electric drive unit further includes a transmission with a planetary gear set for speed reduction.

WO 2022/023303 A1 to Karlsson et al. discloses a transmission that can be used in both an electric axle and a central drive unit. In Karlsson's transmission a dog clutch is used to shift between different gears. Karlsson further discloses an electric drive unit architecture with two motors arranged in series.

The inventors have recognized several issues with both Schneider's electric drive unit and Karlsson's transmission. For instance, positioning the motors fore and aft of the axle shaft in Schneider's drive unit may be incompatible with certain vehicle platforms, thereby constraining the drive unit's applicability. Further, Schneider's single speed drive unit embodiment may exhibit inefficiencies during certain operating conditions due to the unit's inability to alter the transmission's gear ratio. Further, arranging motors in series constrains the modalities in which the drive unit can be operated.

The inventors have recognized the aforementioned issues and developed an electric axle to overcome at least a portion of the issues. The electric axle includes, in one example, a first electric machine removably coupled to a first side of an input shaft via a first mechanical attachment interface. The electric axle further includes a transmission with the input shaft that includes a second mechanical interface on a second side that is opposite the first side. The transmission further includes a clutch mounted on an intermediate shaft or the input shaft and configured to shift the transmission between at least two gear ratios. A differential rotationally coupled to the transmission is additionally included in the electric axle. In the electric axle, the first electric machine and the input shaft are coaxially arranged and a rotational axis of a side gear in the differential is arranged parallel to the input shaft. Designing the input shaft with two mechanical connection points allows the transmission's modularity is increased, thereby increasing the drive axle's applicability. A second electric machine, may be removably coupled to the second mechanical attachment interface of the input shaft. In this way, the axle's architecture may be adapted to suit end-use design targets, if desired. Further, positioning the motors at both ends of the input shaft and arranging the motors parallel to the differential allows end users to achieve increased packaging flexibility without affecting desired direction of rotation of transmission gears, direction of oil flow, and internal resultant forces on bearings, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
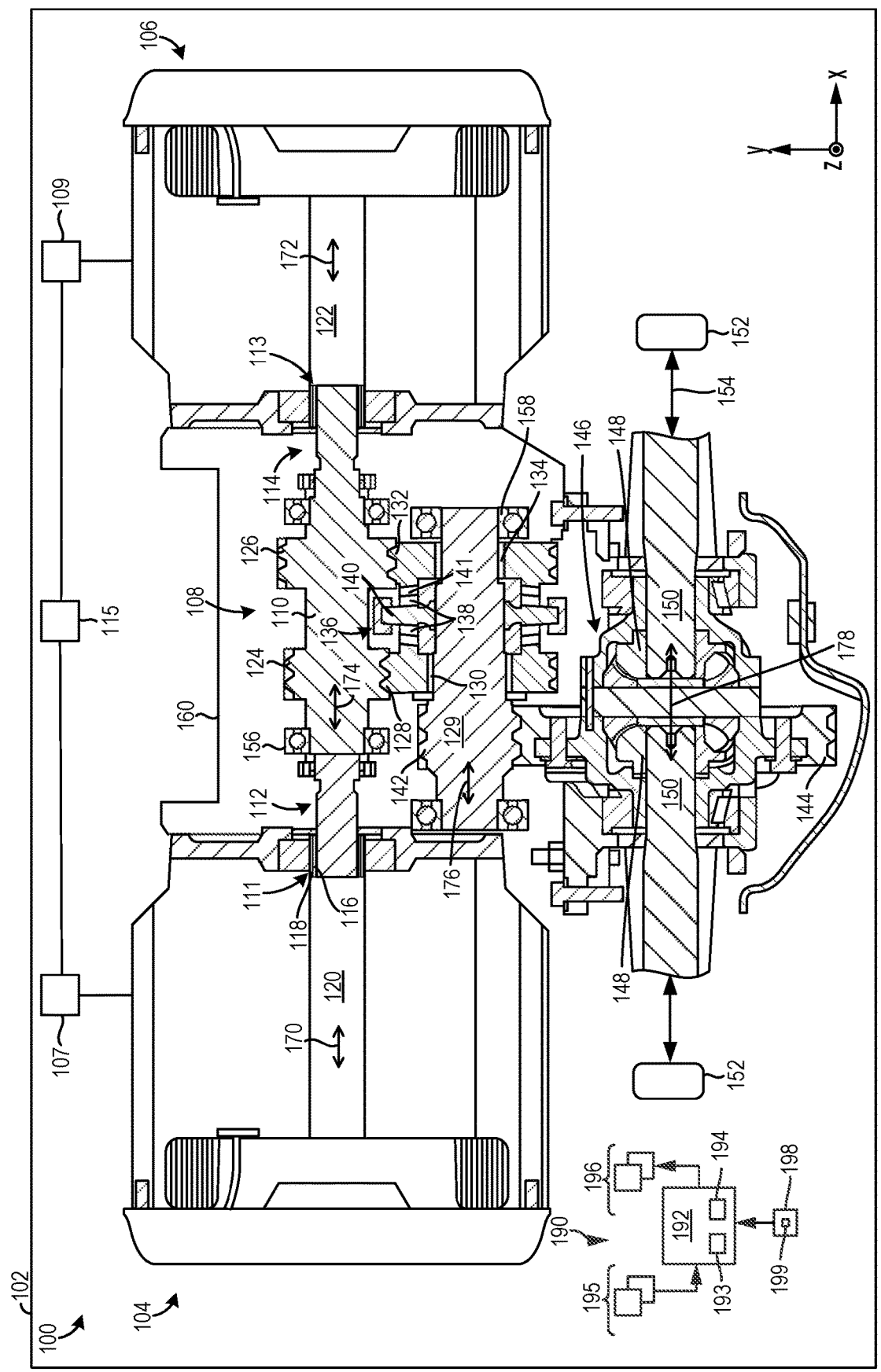
FIG. 1A shows a first example of an electric axle.

An electric axle is described herein with architectural flexibility which allows the axle to be used in a wider variety of vehicle platforms. To achieve the electric axle adaptability, the axle includes a transmission with an input shaft that includes mechanical interfaces at opposing sides of the shaft to allow one or two electric machines (e.g., motor-generators) to be coaxially attached to the input shaft. When the electric axle includes two electric machines, the machines are designed with varying torque capacities to enable the axle's operating mode to be expanded to increase axle efficiency over a wider variety of operating conditions. For instance, in a partial regeneration mode (e.g., single motor regeneration mode), the electric axle may be operated to transfer a portion of the mechanical power generated by one of the electric machines to the drive wheels and another portion of the mechanical power to the other electric machine for electrical energy generation. In this way, the electric axle may be efficiently operated when axle torque demands are relatively low.

FIG. 1 shows an electric axle 100 that may be included in an electric vehicle (EV) 102. The EV may be an all-electric vehicle in one example, although alternative examples are possible such as hybrid electric vehicles (HEV) that utilize an internal combustion engine for propulsion and/or recharging of an energy storage device. Further, the vehicle 102 may be a light, medium, or heavy duty vehicle, for instance.

The electric axle 100 includes a first electric machine 104 (e.g., a first traction motor) and a second electric machine 106 (e.g., a second traction motor), in the illustrated example. However, as explained in greater detail herein, the axle may be adapted to operate with solely one of the first and second electric machines.

The first electric machine 104 and the second electric machine 106 have varying torque capacities. The torque capacity of the machine may be the machine's peak torque or continuous torque. To elaborate, the first electric machine 104 has a higher torque capacity than the second electric machine 106, in the illustrated example. However, the first electric machine may alternatively have a lower torque capacity than the second electric machine 106. Using electric machines with varying torque capacities allows the electric axle to be used in a wider variety of vehicles with different speed and torque demands. Consequently, the electric axle's applicability is expanded. Further, using two electric machines with varying torques, performance and efficiency characteristics allows the modalities of the axle to be expanded, thereby increasing efficiency and therefore vehicle range.

Each of the first electric machine 104 and the second electric machine 106 may include a rotor and a stator that electromagnetically interact to generate rotational output. To vary the torque capacities of the machines, the stator and rotor may be differently sized. Further, the first and second electric machines 104, 106 may be designed as motor-generators to enable the machines to be operated for both drive and regeneration operation.

In the illustrated example, the first and second electric machines 104, 106 are electrically coupled to inverters 107 and 109 via electrical connections (e.g., multi-phase wires, bus bars, combinations thereof, and the like). As such, the electric machines 104, 106 are an alternating current (AC) type motor in the illustrated example. To elaborate, the electric machines may be multi-phase (e.g., three, six, or nine phase) AC motors. In one specific use case example, the electric machines may be a three phase AC motor that is less costly and more efficient than single phase type motors. However, in alternate examples, direct current (DC) electric machines may be used in the electric axle.

The inverters 107, 109 may be electrically connected to one or more energy storage device(s) 115 (e.g., one or more traction batteries, capacitor(s), fuel cell(s), combinations thereof, and the like), as illustrated. However, in alternate configurations, the inverters may be coupled to distinct energy storage devices. As such, electrical energy may flow between the inverters and the energy storage device(s) during drive operation and regeneration operation, when the motors are designed as motor-generators. Cables, bus bars, combinations thereof, and the like may be used to form the electrical connections described herein.

The electric axle 100 includes a transmission 108 (e.g., a multi-speed transmission) that is removably coupled to the electric machines 104, 106 via an input shaft 110. Inputs and outputs of the transmission generally denotes the power flow occurring while the vehicle is operating under a drive condition where mechanical power is transferred from the electric machine(s) to the drive wheels to propel the vehicle in a desired direction (e.g., a forward drive direction or a reverse drive direction). However, it will be appreciated that during regeneration operation, the mechanical power flow occurs in the reverse direction (i.e., from the drive wheels to the electric machine(s)).

The input shaft 110 includes a first mechanical attachment interface 111 on a first side 112 (e.g., a first end) and a second mechanical attachment interface 113 on a second side 114 (e.g., a second end). The first and second mechanical attachment interfaces 111, 113 are configured to removably couple to the first electric machine 104 and the second electric machine 106 or vice versa. To achieve the removable attachment functionality, the mechanical attachment interfaces 111, 113 include splines 116 that mate with splines 118 in the rotor shafts 120, 122 of the electric machines 104, 106. Additionally or alternatively, the input shaft may be coupled to the rotor shafts 120, 122 via flanges and attachment devices (e.g., bolts), welds, interference fitting, combinations thereof, and the like. The splines may be involute splines, in one example, to increase the strength of the interface. However, the splines may be straight splines, in other examples. The type of splines used in the mechanical interfaces may be selected based on expected loading on the input shaft.

The transmission 108 may further include a gear 124 and a gear 126 that are fixedly coupled to the input shaft 110. For instance, the gears 124, 126 may be press-fit, welded, splined, or integrally formed with the input shaft 110. Further, the gears 124, 126 as well as the other transmission gears described herein may be helical gears which provide greater durability than other types of gears such as straight cut gears. However, in other examples, straight cut gears may be used in the transmission.

The gear 124 meshes with a gear 128 that is idly mounted to an intermediate shaft 129. For instance, a bearing 130 (e.g., needle bearing) may be used to idly mount the gear 128 to the intermediate shaft 129. The bearings described herein may include outer races, inner races, roller elements (e.g., balls, cylinders, tapered cylinders, needle rollers, and the like). Idly mounting refers to the attachment of a gear to a shaft such that the gear and shaft are able to independently rotate. The gear 126 meshes with a gear 132 that is additionally idly mounted to the intermediate shaft 129. Again, a bearing 134 (e.g., needle bearing) may be used to achieve the idle mounting functionality. The use of needle bearings in the transmission allows the transmission's compactness to be increased.

A clutch 136 may be mounted on the intermediate shaft 129. The clutch 136 may be configured to selectively engage the gear 128 and the gear 132 to allow mechanical power to be transferred from the engaged gear to the intermediate shaft. The clutch 136 may further be configured to be operated in a neutral position where neither of the gears 128, 132 are engaged and therefore mechanical power transfer between the input shaft and the intermediate shaft is inhibited. It may be desirable to place the transmission in neutral during tow operation for example, to reduce back electromotive force (EMF), for instance. Thus, the clutch may be placed in at least three positions (e.g., a first gear position, a second gear position, and a neutral position), in one example.

The clutch 136 is specifically illustrated as a synchronizer which includes toothed faces 138 on opposing axial sides of a component 140. The toothed faces 138 are designed to mate with toothed faces 141 on axial sides of the gears 128, 132. The synchronizer is configured to bring the shaft and gear speeds together to enable smoother alignment and meshing of the teeth. The synchronizer may further include a synchronizer ring to enable the speed matching functionality. The synchronizer may be electromechanically, hydraulically, and/or pneumatically actuated. For instance, a shift fork may be used to actuate the synchronizer. In other examples, the clutch may be a dog clutch which may however decrease shifting smoothness.

In another example, the clutch 136 may be mounted on the input shaft 110. In such an example, the gears 124, 126 may be idly mounted to the input shaft 110 and the gears 128, 132 may be conversely fixedly coupled to the intermediate shaft. Further, in such an example, the clutch may be designed to selectively engage the gears on the input shaft and permit mechanical power transfer therebetween when desired.

The intermediate shaft 129 is positioned between the first electric machine 104 and the second electric machine 106 (with regard to the x-axis) to increase transmission compactness and allow the mass of the axle to be more concentrated, in the illustrated example. Consequently, the vehicle's performance with regard to handling may be enhanced. However, in other examples, the intermediate shaft may be spaced away from the region between the electric machines which may however decrease transmission compactness. Further, as illustrated, the electric machines 104, 106 and the input shaft 110 are coaxial to one another and a rotational axis of a differential 146 (described in greater detail herein) is arranged parallel to the rotational axes of the electric machines, the electric axle achieves a desired compactness and mass balance that enable the vehicle's handling to be enhanced.

Further, in the illustrated example, the intermediate shaft 129 includes a gear 142 fixedly coupled thereto or integrally formed therewith and meshes with an input gear 144 in the differential 146. However, other transmission architectures have been contemplated. For instance, the transmission may include additional shafts and/or clutches. Further, it will be appreciated that when the transmission is a two-speed transmission with an input shaft and an intermediate shaft, the transmission achieves a desired balance between gear ratio range and compactness for certain vehicle applications. However, in alternate examples, the transmission may have additional operating gear(s) and therefore may include additional clutches and/or shafts. Still further in other examples, the transmission may be a single speed transmission.

The input gear 144 in the differential 146 may be a ring gear and the differential may further include side gears 148 that are fixedly coupled to axle shafts 150 (e.g., half shafts). In turn, the axle shafts may be coupled to drive wheels 152. Arrows 154 denote the mechanical connection between the drive wheels and the axle shafts. The axle may further include hubs that allow the drive wheels to rotate.

Further, in one example, the electric axle 100 may be a beam axle where the camber angle of the wheels remains substantially constant through the suspension's travel. In the beam axle embodiment, the axle may therefore be coupled to a dependent suspension system. Beam axles have increased durability when compared to other types of axles. However, in other examples, the electric axle may not be a beam axle and therefore may be coupled to an independent suspension system.

The electric axle may further include a control system 190 with a controller 192 as shown in FIG. 1A. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed. As such, control techniques, methods, and the like expanded upon herein may be stored as instructions in non-transitory memory.

The controller 192 may receive various signals from sensors 195 coupled to various regions of the electric axle. For example, the sensors 195 may include a pedal position sensor designed to detect a depression of an operator-actuated pedal such as an accelerator pedal and/or a brake pedal, a speed sensor at the transmission output shaft, energy storage device state of charge (SOC) sensor, a clutch position sensor, and the like. Motor speed may be ascertained from the amount of power sent from the inverter 107 to the first electric machine 104. Input devices 198 (e.g., an accelerator pedal, a brake pedal, a drive mode selector, a gear selector 199, combinations thereof, and the like) may further provide input signals indicative of an operator's intent for vehicle control. The gear selector 199 may include discrete positions such as drive and reverse as well as first gear and second gear that allow an operator to place the transmission in a forward drive mode, a reverse drive mode, a first gear mode, and a second gear mode. It will be appreciated, that when an operator places the transmission in a forward drive mode, the transmission may then automatically shift based on transmission speed, load, and/or torque demand.

Upon receiving the signals from the various sensors 195 of FIG. 1A, the controller 192 processes the received signals, and employs various actuators 196 of electric axle components to adjust the components based on the received signals and instructions stored on the memory of controller 192. For example, the controller 192 may receive an accelerator pedal signal indicative of an operator's request for increased vehicle acceleration. In response, the controller 192 may command operation of the inverter 107 and/or the inverter 109 to adjust the mechanical power output of the associated machine and increase the power delivered from the electric machines to the transmission 108. The controller 192 may during certain operating conditions, be designed to send commands to the clutch 136, to carry out a shift where the clutch engages the gear 128 or the gear 132. For instance, a control command (e.g., first gear, second gear, or neutral) may be sent to the clutch and in response to receiving the command, an actuator in the clutch may adjust the clutch based on the command for clutch movement. The other controllable components in the vehicle may function in a similar manner with regard to sensor signals, control commands, and actuator adjustment, for example.

Bearings 156 may be coupled to the input shaft 110 and permit rotation thereof. Further, bearings 158 may be coupled to the intermediate shaft 129 and permit rotation thereof. The bearings 156, 158 may be positioned axially outboard of the gears that reside on the shaft to which they are attached. A housing section 160 may extend between the electric machines 104, 106 to reduce ingress of water, debris, and the like into the transmission 108, thereby increasing axle durability.

An axis system is provided in FIG. 1A as well as FIGS. 1B-3B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Rotational axes 170, 172, 174, 176, 178 of the first electric machine 104, the second electric machine 106, the input shaft 110, the intermediate shaft 129, and the differential 146 are provided for reference. The rotational axis 178 of the differential specifically corresponds to the rotational axis of both the side gears and the input gear of the differential.

Figure 1B:
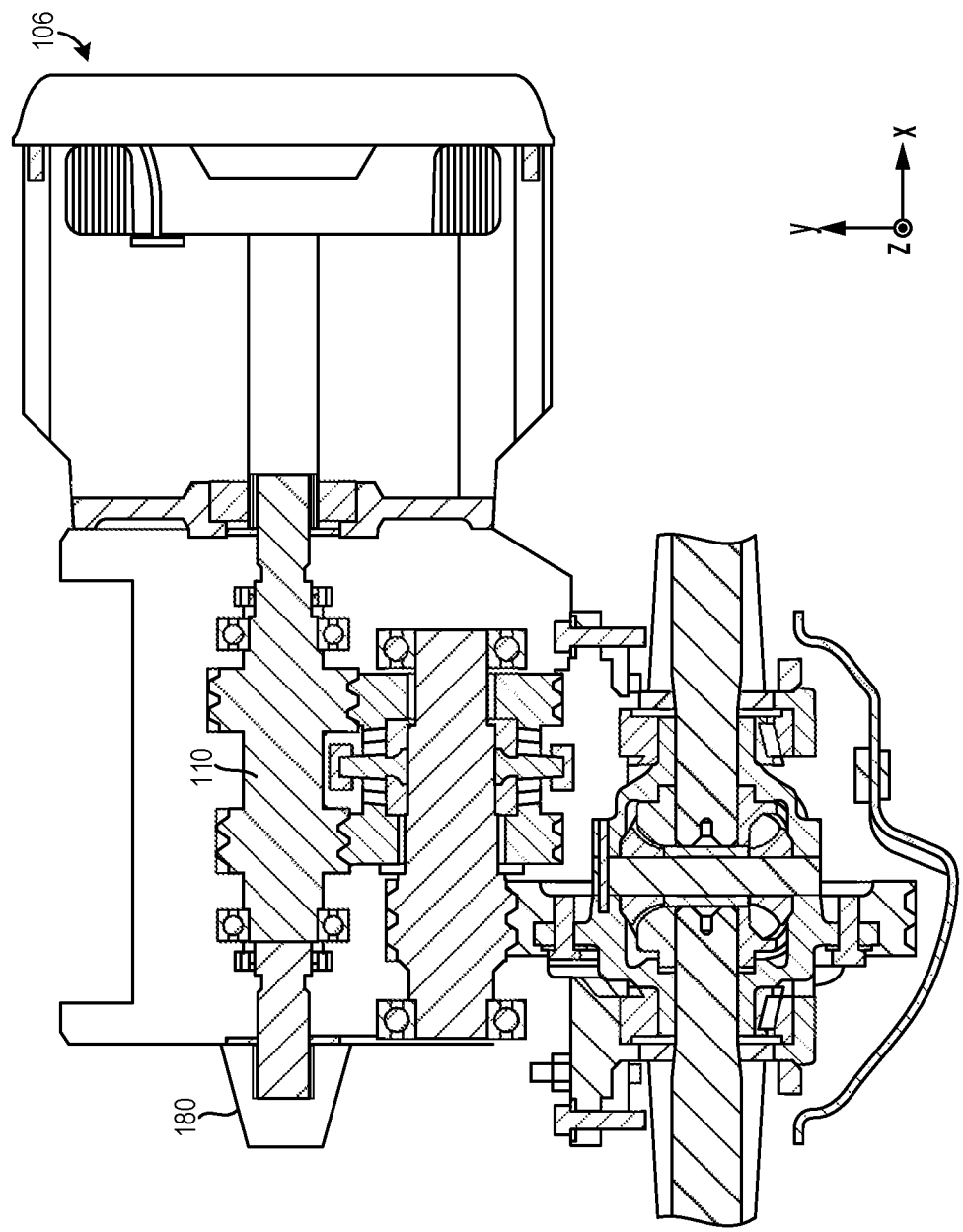
FIG. 1B shows the electric axle, depicted in FIG. 1A, with the larger capacity electric machine removed.
Figure 1C:
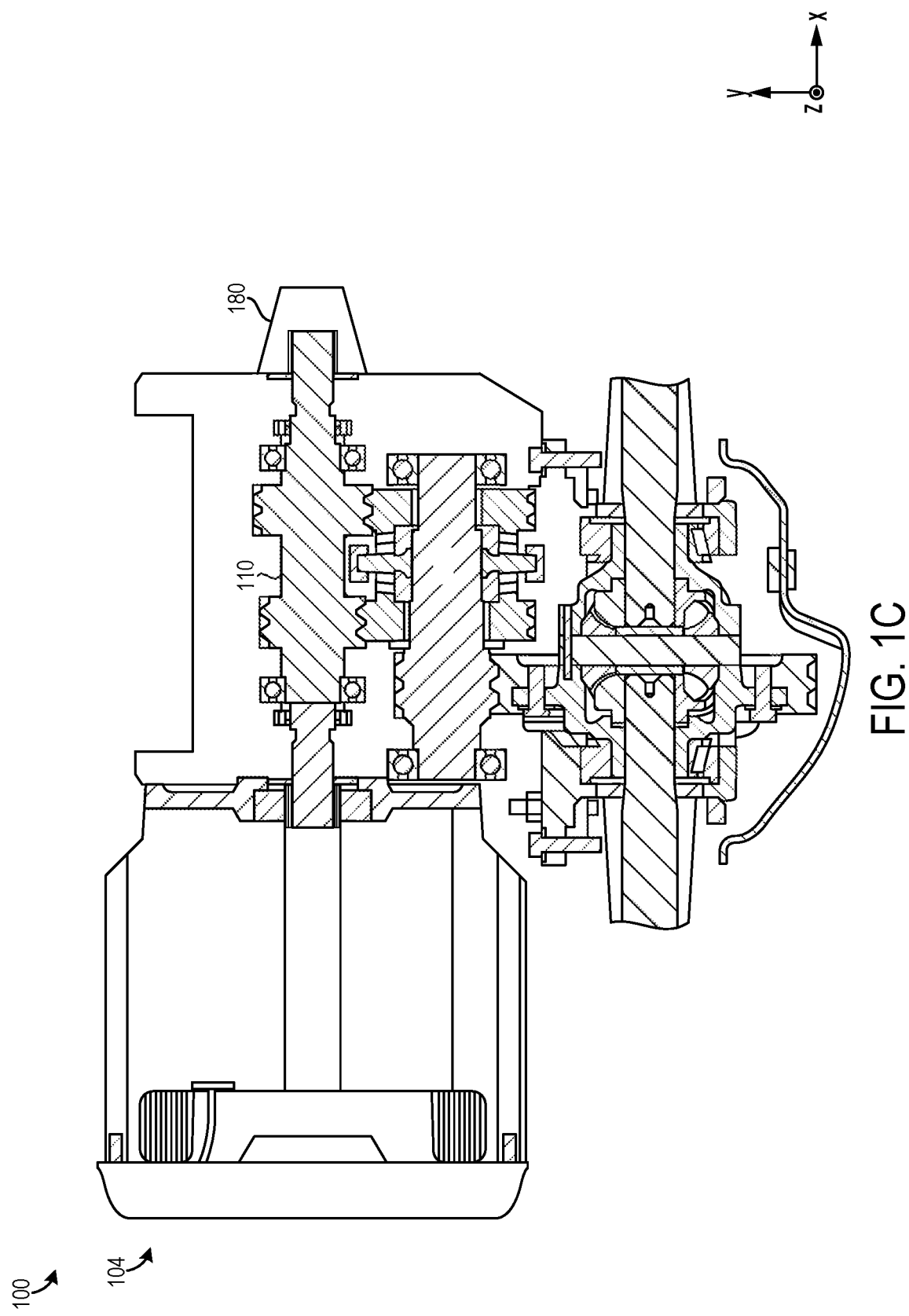
FIG. 1C shows the electric axle, depicted in FIG. 1A, with the smaller capacity electric machine removed.

FIGS. 1B and 1C show different arrangements of the electric axle 100 with the first electric machine 104 and the second electric machine 106 remove therefrom, respectively. In this way, the electric axle may be efficiently adapted for different vehicle platforms. In both of the modified electric axle architectures, a cover 180 may be provided in the electric axle to protect the exposed end of the input shaft 110 which has been decoupled from the corresponding electric machine. Other than the removal of the electric machines from the electric axle architectures shown in FIGS. 1B and 1C, the remaining components in the electric axles are similar to the electric axle depicted in FIG. 1A. Redundant description is therefore omitted for concision.

Figure 2A:
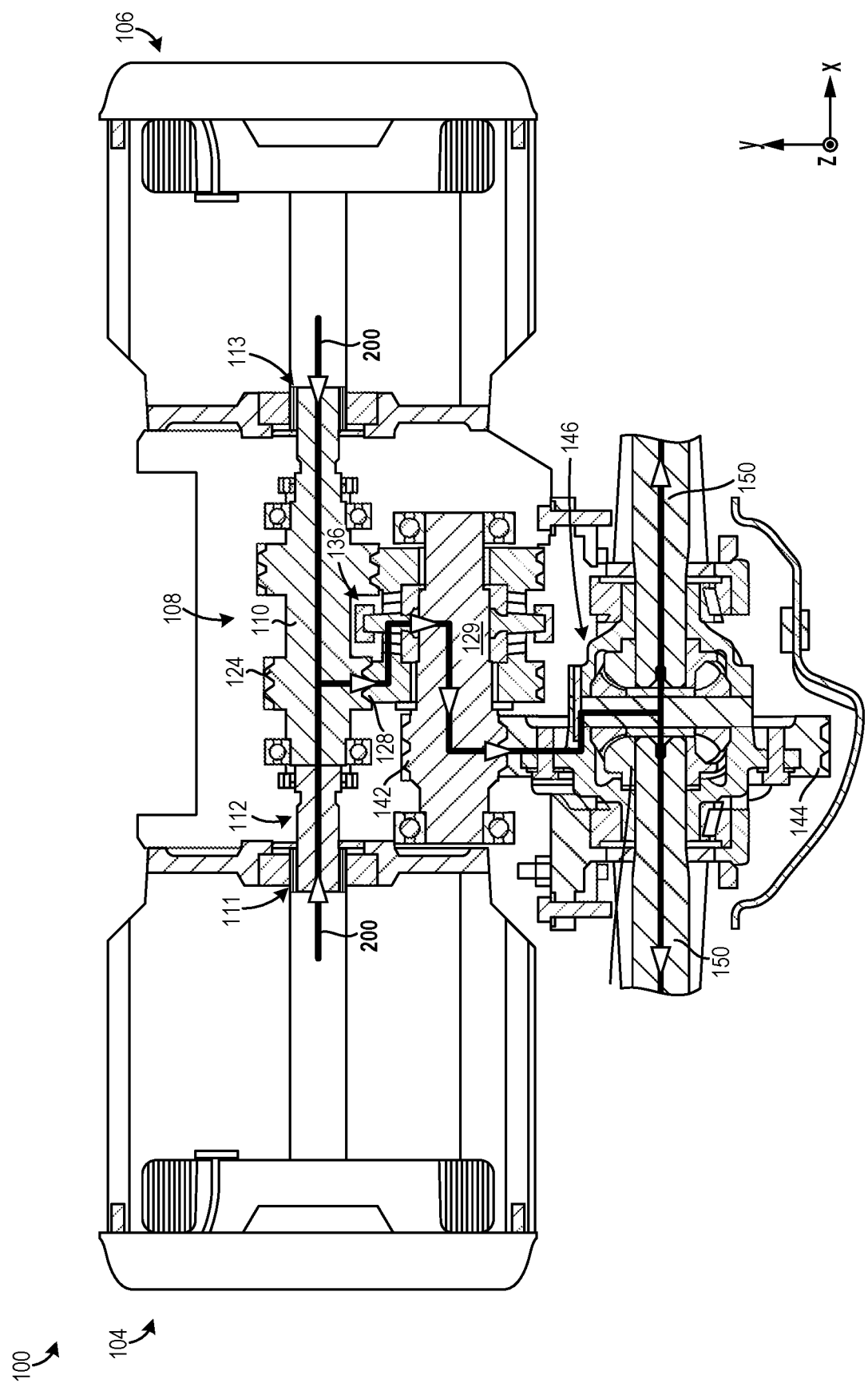
FIG. 2A shows a power path for the electric axle, depicted in FIG. 1A, operating in a first gear.
Figure 2B:
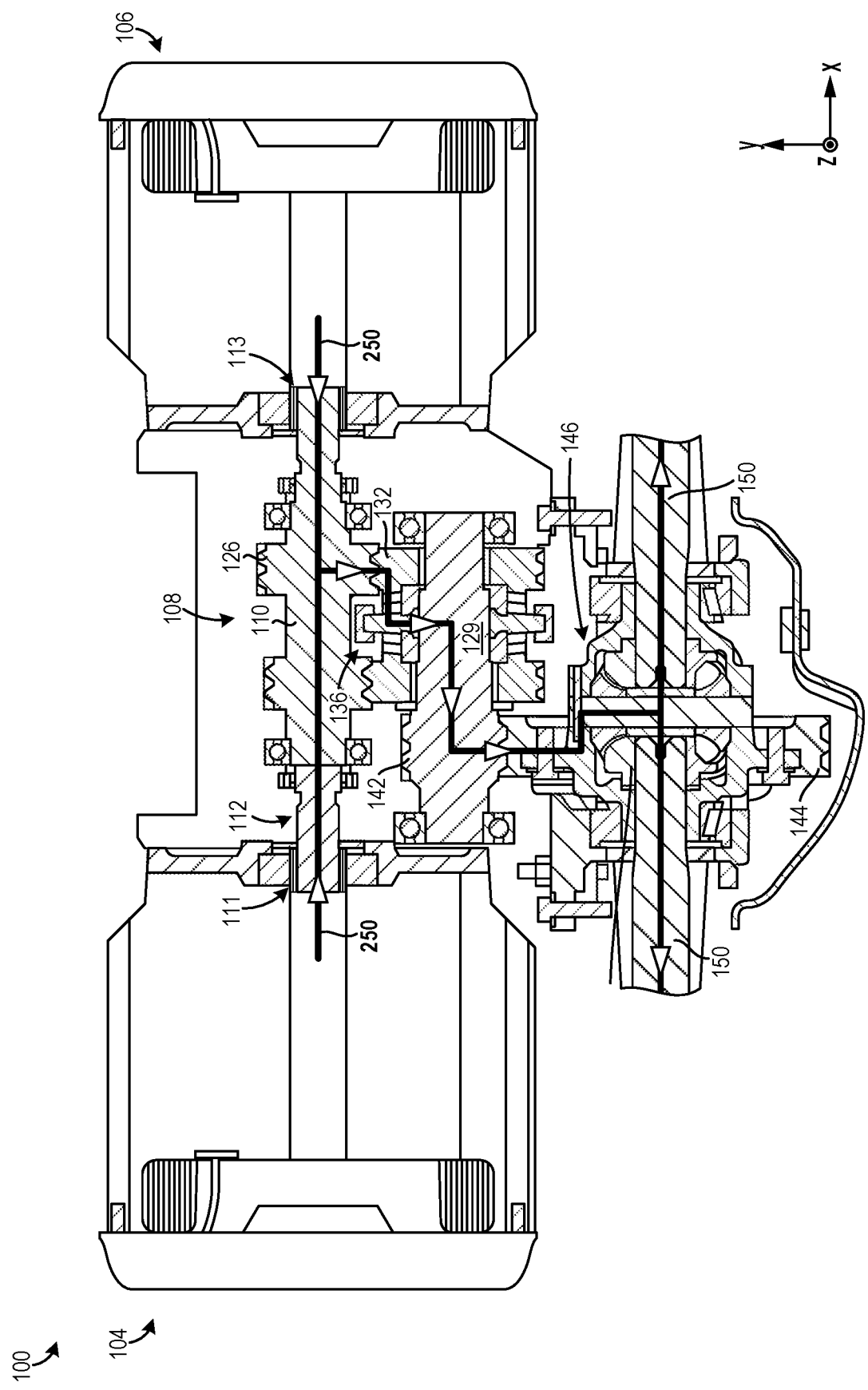
FIG. 2B shows a power path for the electric axle, depicted in FIG. 1A, operating in a second gear.

FIGS. 2A, 2B, 3A, 3B, and 3D show different mechanical power paths that occur during different operating modes of the electric axle 100. Turning specifically to FIGS. 2A and 2B which show mechanical power paths 200 and 250 that occur while the electric axle 100 is operating in a drive mode (e.g., forward drive or reverse drive) in a first gear and a second gear, respectively. In the first gear, the operating gear ratio is higher than the gear ratio of the second gear. As such, the first gear may be used during lower speed vehicle operation, such as launch, and the second gear may be used during higher speed vehicle operation. In the first gear drive mode shown in FIG. 2A, the clutch 136 engages the gear 128 such that mechanical power is transferred from the gear 128 to the intermediate shaft 129 by way of the clutch. On the other hand, in the second gear drive mode shown in FIG. 2B, the clutch 136 engages the gear 132 such that mechanical power is transferred from the gear 132 to the intermediate shaft 129 by way of the clutch. The clutch may be shifted between the first gear and second gear and vice versa in response to operator interaction with a gear selector or automatically initiated in response to a change in torque demand and/or transmission load, for instance.

It will be understood that the rotational output of the electric machines may be reversed to operate the electric axle in a reverse drive mode. Allowing the machines to spin in opposing directions allows the space efficiency of the electric axle to be increased when compared to transmissions that utilize mechanical reverses. However, in alternate examples, the transmission 108 may include a mechanical reverse assembly.

In both the power paths 200 and 250, mechanical power flows from the first electric machine 104 and the second electric machine 106 to the input shaft 110 via the first mechanical attachment interface 111 and the second mechanical attachment interface 113. Further, in both of the power paths 200 and 250, mechanical power travels from the intermediate shaft 129 to the gear 142, from the gear 142 to the gear 144 in the differential 146, and from the differential to the axle shafts 150.

In power path 200 shown in FIG. 2A, mechanical power travels to the intermediate shaft 129 by way of the gear 124, the gear 128, and the clutch 136. In this way, the axle is operated in the first gear mode.

On the other hand, in power path 250 shown in FIG. 2B, the mechanical power travels to the intermediate shaft 129 by way of the gear 126, the gear 132, and the clutch 136. In this way, the axle is operated in the second gear mode.

Figure 3A:
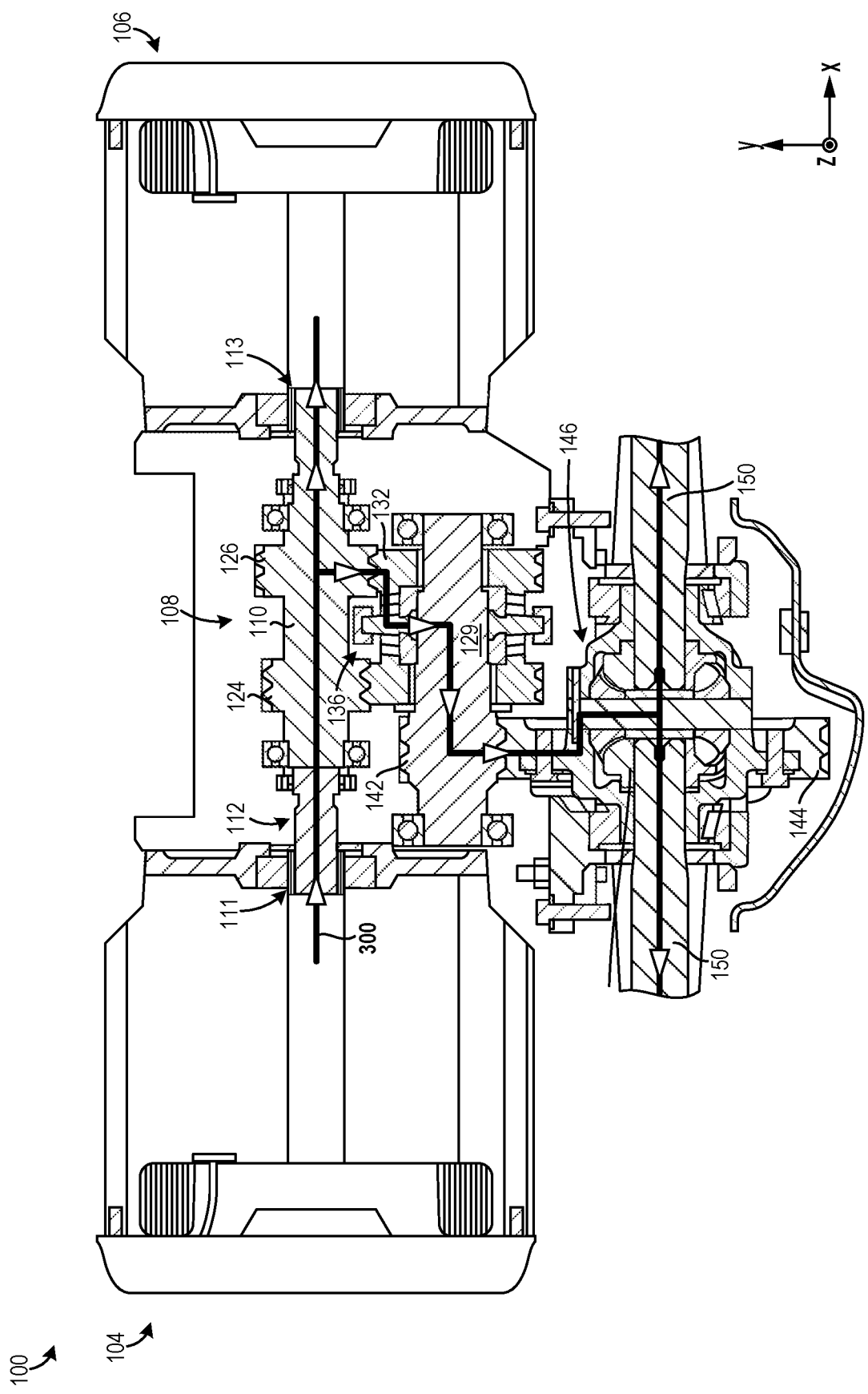
FIG. 3A shows a power path for the electric axle, depicted in FIG. 1A, operating in a first partial regeneration mode.
Figure 3B:
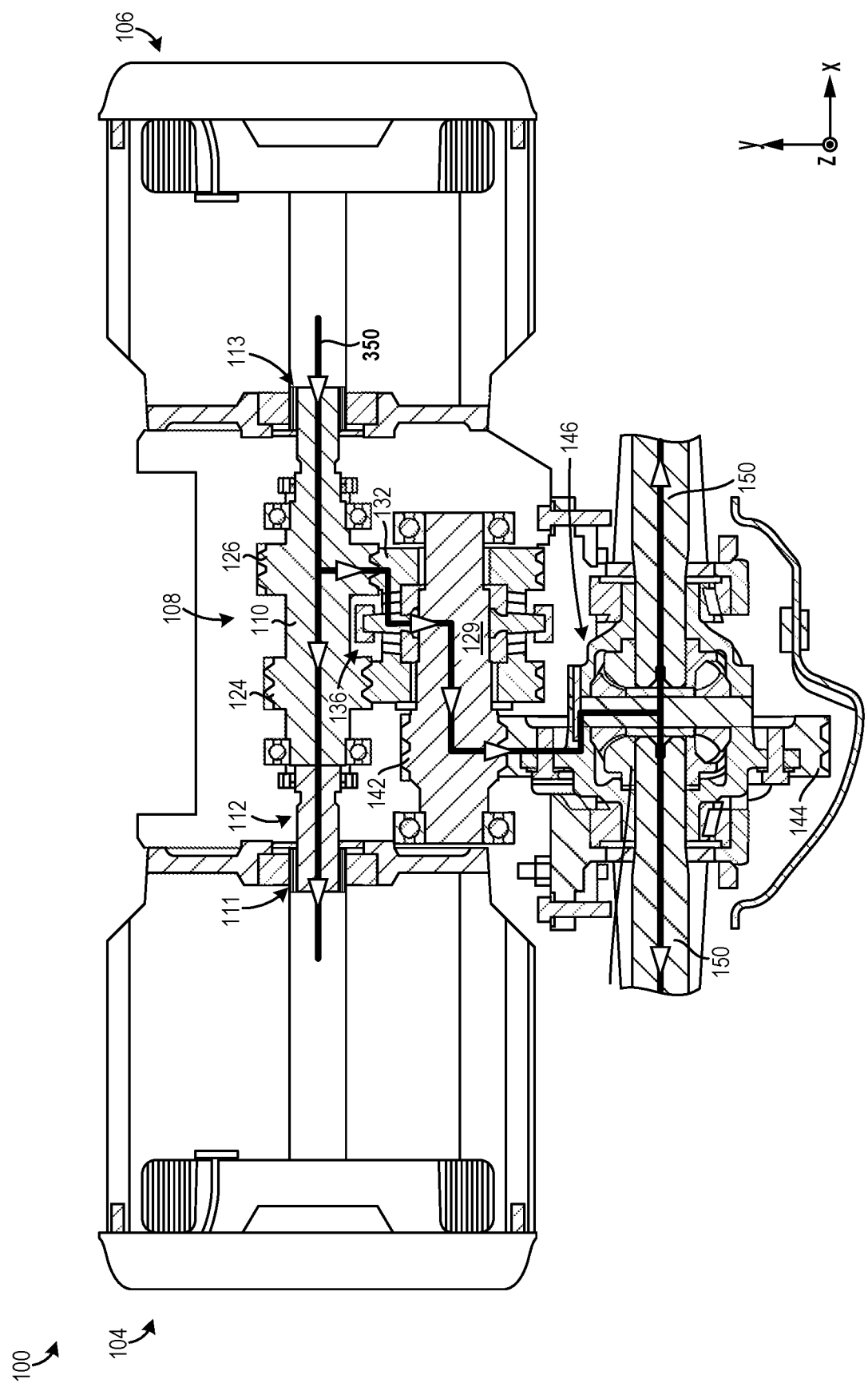
FIG. 3B shows a power path for the electric axle, depicted in FIG. 1A, operating in a second partial regeneration mode.

FIGS. 3A and 3B specifically show power paths 300 and 350, respectively, while the electric axle 100 is operated in different partial regeneration modes (e.g., single motor regeneration modes). Specifically, FIG. 3A shows the electric axle operated in a single motor regeneration mode where the first electric machine 104 is operated in a drive mode and the second electric machine 106 is operated in a regeneration mode. In the power path 300, power is transferred from the first electric machine 104 to the second electric machine 106 by way of the input shaft 110 and specifically through the mechanical attachment interfaces 111 and 113. Next the power travels from the input shaft 110 to the gear 126, from the gear 126 to the gear 132, from the gear 132 to the intermediate shaft 129 by way of the clutch 136. Next, power is transferred to the gear 142 and then to the differential 146 via gear 144. Next, the power travels from the differential 146 to the axle shafts 150.

FIG. 3B specifically shows the electric axle 100 operated in another partial regeneration mode (e.g., single motor regeneration mode) where the second electric machine 106 is operated in a drive mode and the first electric machine 104 is operated in a regeneration mode. In the power path 350, power is transferred from the second electric machine 106 to the first electric machine 104 by way of the input shaft 110 and specifically through the mechanical attachment interfaces 113 and 111. Next the power travels from the input shaft 110 to the gear 126, from the gear 126 to the gear 132, from the gear 132 to the intermediate shaft 129 by way of the clutch 136. Next, power is transferred to the gear 142 and then to the differential 146 via gear 144. Next, the power travels from the differential 146 to the axle shafts 150. It will be appreciated that the single motor regeneration modes may also be implemented while the electric axle is operated in the first gear where mechanical power travels through the gears 124 and 128. These single motor regeneration modes allow the axle to be more efficiently operated over a wider range of operating conditions.

Further, the electric axle 100 may be operated in a full regeneration mode where mechanical power from the drive wheels is transferred to both of the electric machines 104, 106 by way of the transmission 108. In turn, both electric machines generate electrical energy. The power path through the transmission in the full regeneration mode may travel through the gear combination 124 and 128 or the gear combination 126 and 132. The full regeneration mode may be configured to additionally have regenerative braking, which reduces load on the mechanical brakes.

Figure 3C:
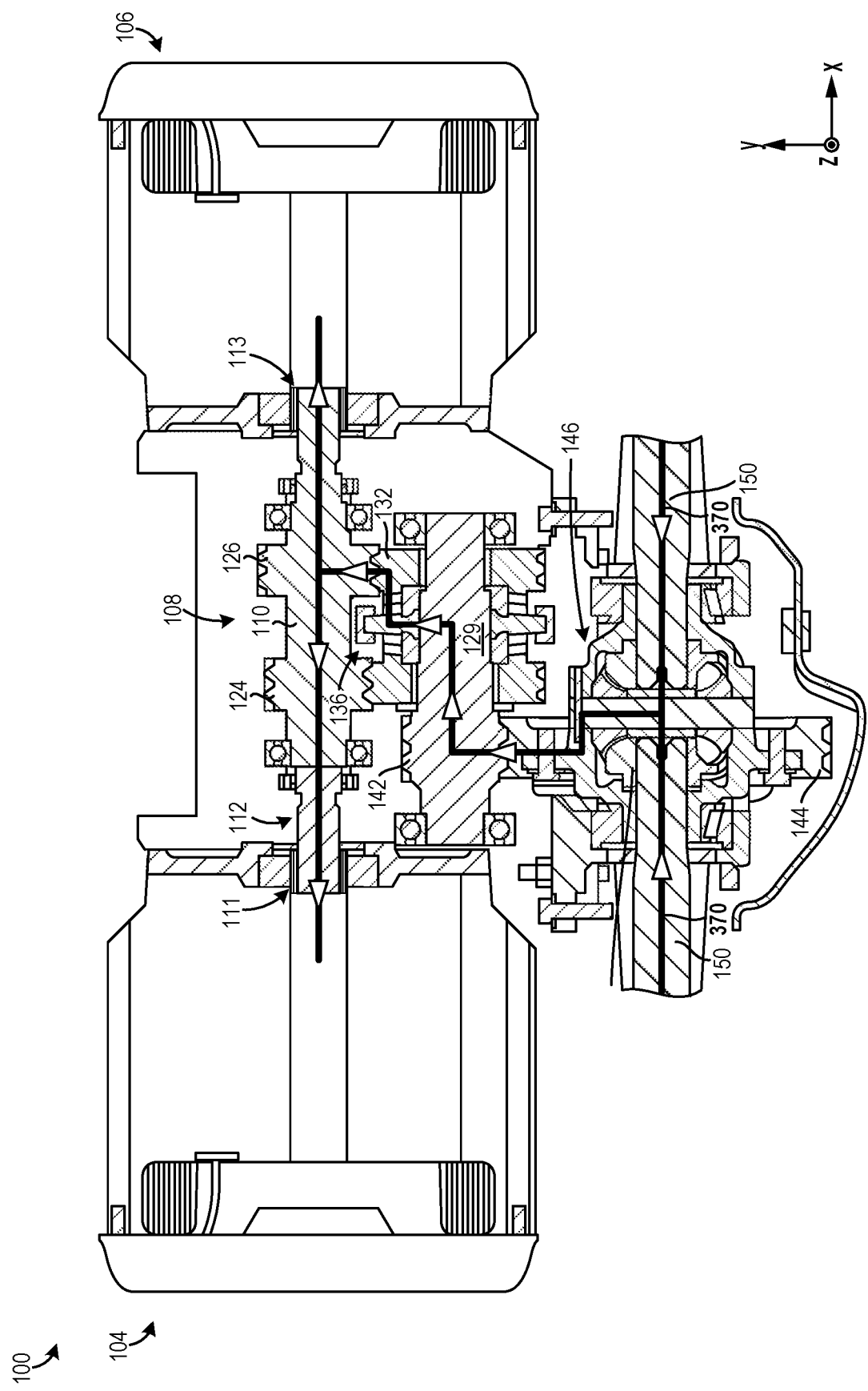
FIG. 3C shows a power path for the electric axle, depicted in FIG. 1A, operating in a full-regeneration mode.

FIG. 3C specifically shows the electric axle 100 operated in the full regeneration mode (e.g., dual-motor regeneration mode) where the second electric machine 106 is operated in a regeneration mode and the first electric machine 104 is operated in a regeneration mode. The full regeneration mode may be implemented during deceleration and braking, for instance. In the power path 370, power is transferred from the axle shafts 150 to the differential 146. From the differential, power travels to the gear 144. From the gear 144 power travels to the gear 142 and then to the intermediate shaft 129. Next power travels through the clutch 136 to the gear 132 and then to gear 126. From the gear 126 power travels through the input shaft 110 to the first electric machine 104 and the second electric machine 106 where electrical energy is generated.

Figure 4:
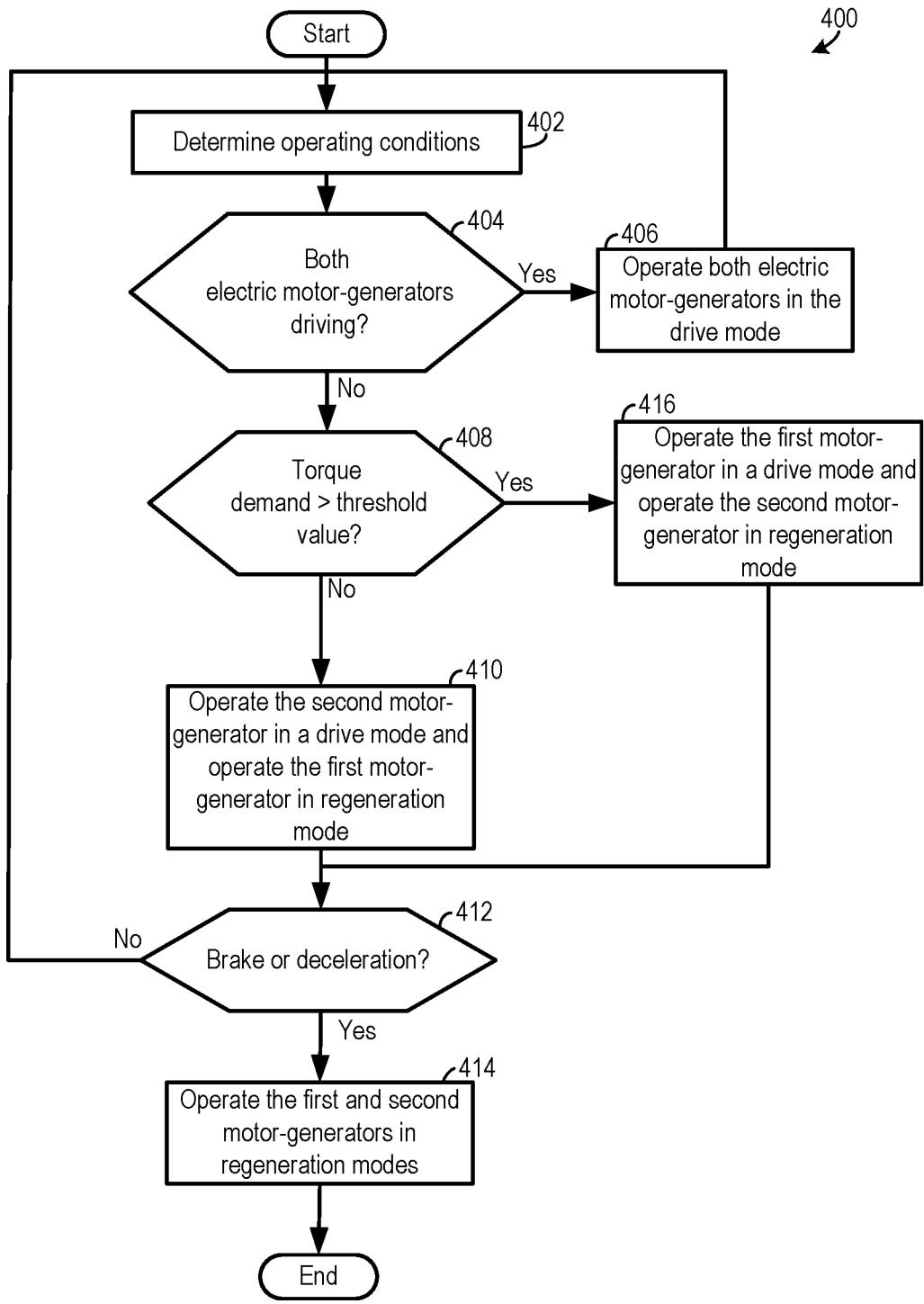
FIG. 4 shows a method for operation of an electric axle.

FIG. 4 shows a method 400 for operation of an electric axle. The method 400 may be carried out by the electric axle 100 shown in FIG. 1A, in one example. In other examples, the methods may be implemented by other suitable electric axles, or combinations of the electric axles described herein. Furthermore, the method 400 may be implemented by a controller that includes memory holding instructions for the method steps that are executable by a processor, as previously indicated.

The method 400 includes at 402, determining operating conditions. The operating conditions may include input device position (e.g., gearshift lever position), clutch configuration, transmission input/output speed, motor speed, vehicle speed, vehicle load, ambient temperature, and the like. The operating conditions may be ascertained via sensor inputs, modeling, look-up tables, combinations thereof, and other suitable techniques.

Next at 404, the method includes judging if the electric axle should be placed in a mode where both electric motor-generators are operated in drive mode. This judgement may occur based on a torque demand on the electric axle and an output speed of the transmission and/or transmission load. For instance, the electric axle may be placed in the dual-motor drive mode when a torque demand is present (e.g., torque demand>0) and the transmission speed and/or load is greater than a threshold value. The transmission speed and/or load threshold may be a threshold indicative of a threshold over which both motors need to be used to meet the torque demand.

If it is determined that the electric axle should be placed in the dual-motor drive mode (YES at 404), the method moves to 406 where the method includes operating both electric motor-generators in the drive mode. To elaborate, the electric axle is operated in a drive mode where both of the electric motor-generators are transferring mechanical power to the drive wheels.

On the other hand, if it is determined that the electric axle should not be placed in the dual-motor mode (NO at 404) the method moves to 408. At 408, the method including determining if the torque demand on the electric axle is greater than a threshold value. The threshold value allows a judgement to be made whether to place the electric axle in one of the two single motor regeneration modes for the electric axle.

If it is determined that the torque demand on the electric axle is not greater than the threshold value (NO at 408), the method moves to 410. At 410, the method includes operating the second motor-generator in a drive mode and operating the first motor-generator in regeneration mode. As such, in this single motor regeneration mode, the second motor-generator transfers mechanical power to the drive wheels by way of the transmission and transfers mechanical power to the first motor-generator which converts the mechanical power into electric power. The electric power may be transferred to the energy storage device, in some cases.

Next at 412 the method includes determining if the electric axle should be operated in a braking or deceleration mode. If it is determined that the electric axle should not be operated in a braking or deceleration mode (NO at 412) the method returns to 402. Conversely, if it is determined that the electric axle should be operated in a braking or deceleration mode (YES at 412) the method moves to 414. At 414, the method includes operating the first and second motor-generators in regeneration modes.

If it is determined that the torque demand on the electric axle is greater than the threshold value (YES at 408), the method moves to 416. At 416, the method includes operating the first motor-generator in a drive mode and operating the second motor-generator in regeneration mode. As such, in this single motor regeneration mode, the first motor-generator transfers mechanical power to the drive wheels by way of the transmission and transfers mechanical power to the second motor-generator which converts the mechanical power into electric power. The electric power may be transferred to the energy storage device, in some cases. After 416, the method moves to 412 and after 414, the method ends. Method 400 allows the electric axle to be operated in multiple single motor regeneration modes to increase axle adaptability and increase motor efficiency.

Figure 5:
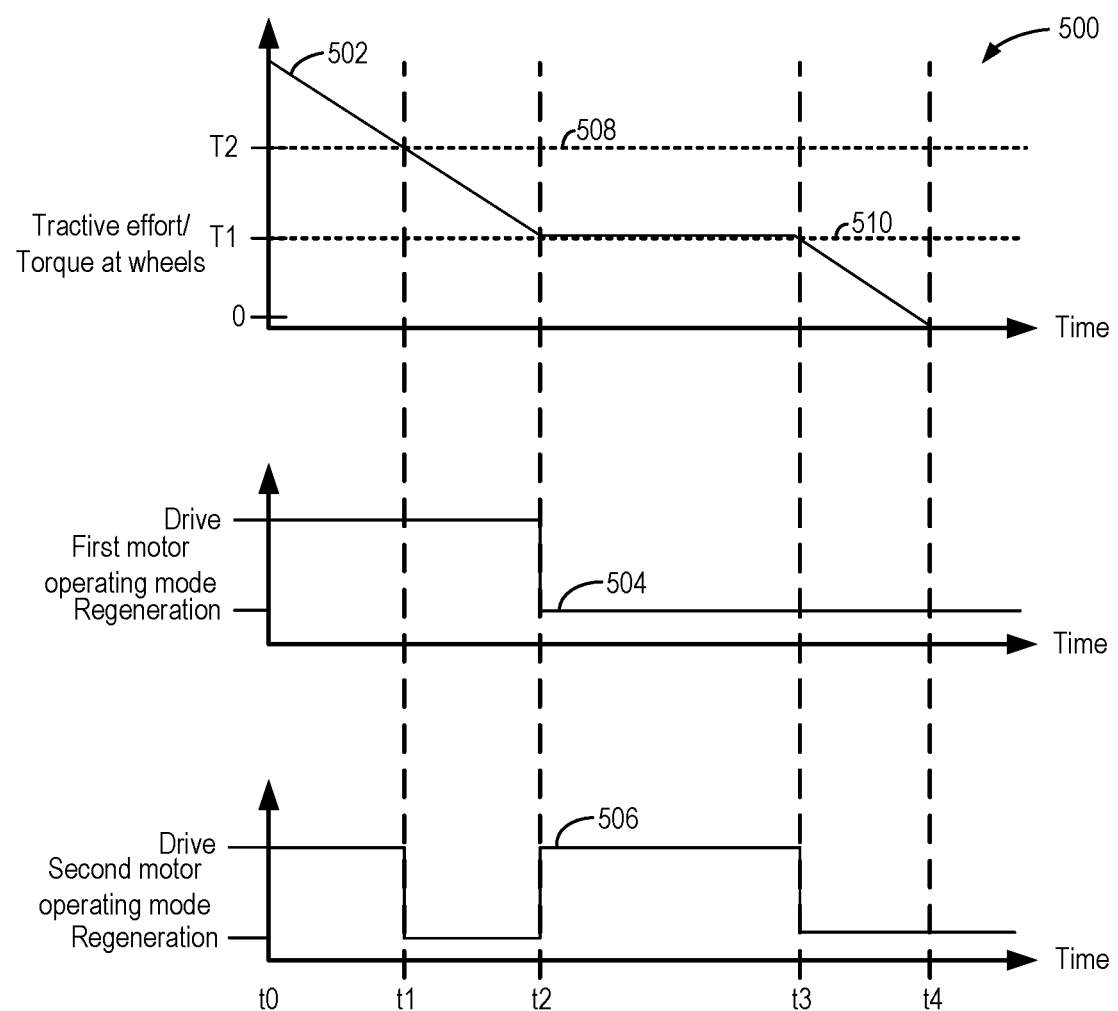
FIG. 5 shows a timing diagram of an exemplary operating technique for an electric axle.

FIG. 5 shows a prophetic timing diagram 500 of a use-case electric axle operating technique. This operating technique may be implemented in any of the electric axles described herein or combinations of the electric axles. In each graph, time is indicated on the abscissa and increases from left to right, although specific numerical values are not indicated.

The ordinate for plot 502 indicates the tractive effort/torque demand at wheels and increases in the direction of the arrow, although specific numerical values are not indicated. The ordinate for plot 504 indicates the operational state (i.e., "Drive" and "Regeneration") of the first motor-generator and the ordinate for plot 506 indicates the operational state (i.e., "Drive" and "Regeneration") of the second motor-generator. In the drive mode, the motor-generator transfers mechanical power to the drive wheels by way of the transmission. In the regeneration mode, the motor-generator receives mechanical power and converts the power into electrical energy.

From t0 to t1 both of the motors are operated in a drive mode. As shown, at t1 the tractive effort falls below a first threshold value 508 and the second motor-generator transitions from the drive mode to the regeneration mode while the first motor-generator is sustained in the drive mode. In this way, the electric axle may be operated in a single motor regeneration mode to increase the axle's efficiency across a wider range of operating conditions.

Next at t2, the tractive effort reaches a second threshold value 510 and the first motor is transitioned from the drive mode to the regeneration mode while the second motor is transitioned from the regeneration mode to the drive mode. In this way, another single motor regeneration mode is implemented to increase the axle's efficiency.

From t2 to t3 the first motor-generator is sustained in the regeneration mode while the second motor-generator is sustained in the drive mode. In this way, the electric axle is operated in a single motor regeneration mode. At t3 the tractive effort drops below the threshold 510 and both motors are operated in regeneration modes which occurs during deceleration and braking, for instance.

The technical effect of the electric axle operating methods described herein is to increase the axle's performance and efficiency by allowing one of the motors to operate in a regeneration mode while the other motor supplies mechanical power to both the drive wheels and the motor which is operated in the regeneration mode. Additionally, the axle's efficiency is increased when both motors are operated in regeneration modes during deceleration and braking.

FIGS. 1A-3C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric axle is provided that comprises a first electric machine removably coupled to a first side of an input shaft via a first mechanical attachment interface; a transmission including: the input shaft that includes a second mechanical interface on a second side that is opposite the first side; and a clutch mounted on an intermediate shaft or the input shaft and configured to shift the transmission between at least two gear ratios; and a differential rotationally coupled to the transmission; wherein the first electric machine and the input shaft are coaxially arranged; and wherein a rotational axis of a side gear in the differential is arranged parallel to the input shaft.

In another aspect, a method for operation of an electric axle is provided that comprises operating a first electric motor-generator to transfer mechanical power to a multi-speed transmission and to a second electric motor-generator; operating the second electric motor-generator in a regeneration mode where the second electric motor-generator generates electrical energy; wherein the first and second motor-generators and an input shaft in the multi-speed transmission are coaxially arranged; and wherein the first and second motor-generators have different torque capacities, performance, and efficiency characteristics. In one example, the method may further comprise, while the second electric motor-generator is operated in a regeneration mode, shifting the multi-speed transmission between a first gear ratio and a second gear ratio via operation a clutch mounted on an intermediate shaft or the input shaft. In another example, the method may further comprise shifting the multi-speed transmission into neutral via operation a clutch mounted on an intermediate shaft or the input shaft.

In yet another aspect, an electric axle is provided that comprises a first traction motor-generator directly and removably coupled to a first end of an input shaft a second traction motor-generator directly and removably coupled to a second end of the input shaft; a multi-speed transmission including: the input shaft; and a clutch mounted on an intermediate shaft and configured to shift the multi-speed transmission between a first gear reduction and a second gear reduction; and a differential with an input gear that meshes with a gear on the intermediate shaft; wherein the first traction motor-generator has a higher torque capacity than the second traction motor-generator; and wherein the first traction motor-generator, the second traction motor-generator, and the input shaft are coaxially arranged.

In any of the aspects or combinations of the aspects, the electric axle may further comprise a second electric machine removably coupled to the second mechanical interface, wherein the first and second electric machines have different torque capacities, performance, and efficiency characteristics.

In any of the aspects or combinations of the aspects, the first and second electric machines may be motor-generators; and the electric axle may further comprise: a controller including instructions that when executed, during partial regeneration mode, cause the controller to: operate the first electric machine in a regeneration mode where mechanical power is transferred from the second electric machine to the first electric machine; and operate one of the first and second electric machines in a drive mode.

In any of the aspects or combinations of the aspects, the first electric machine may have a higher torque capacity than the second electric machine.

In any of the aspects or combinations of the aspects, the partial regeneration mode may be a mode where a torque demand for the transmission is below a threshold value.

In any of the aspects or combinations of the aspects, the first and second mechanical attachment interfaces may include splines.

In any of the aspects or combinations of the aspects, the electric axle may further comprise a controller including instructions that when executed, while the first electric machine is shut down, cause the controller to: shift the transmission into neutral via the clutch.

In any of the aspects or combinations of the aspects, the transmission may include a gear fixedly coupled to the intermediate shaft and meshing with an input gear in the differential.

In any of the aspects or combinations of the aspects, the transmission may include a first gear and a second gear fixedly coupled to the input shaft and meshing with a third gear and a fourth gear, respectively, that are idly mounted on the intermediate shaft.

In any of the aspects or combinations of the aspects, the third gear and the fourth gear may be idly mounted to the intermediate shaft via needle bearings.

In any of the aspects or combinations of the aspects, the clutch may be configured to shift the transmission between only two gear ratios.

In any of the aspects or combinations of the aspects, the clutch may be a synchronizer.

In any of the aspects or combinations of the aspects, a rotational axis of a side gear in the differential may be parallel to the input shaft.

In any of the aspects or combinations of the aspects, the clutch may be a synchronizer and is configured to shift into a neutral position where torque transfer between the intermediate shaft and gears associated with the clutch is inhibited.

In any of the aspects or combinations of the aspects, the electric axle may further comprise a controller including instructions that when executed, during a drive mode when a torque demand in the multi-speed transmission is below a threshold value, cause the controller to: operate the first traction motor-generator in a regeneration mode where mechanical power is transferred from the second traction motor-generator to the first traction motor-generator and the first traction motor-generator generates electrical energy.

In any of the aspects or combinations of the aspects, the controller may further comprise: instructions that when executed, during a drive mode when a torque demand in the multi-speed transmission is above the threshold value, cause the controller to: operate the second traction motor-generator in a regeneration mode where mechanical power is transferred from the first traction motor-generator to the second traction motor-generator and the second traction motor-generator generates electrical energy.

In any of the aspects or combinations of the aspects, the electric axle may further comprise a controller including instructions that when executed, during braking and/or deceleration, cause the controller to: operate both of the first traction motor-generator and the second traction motor-generator in a regeneration mode where mechanical power is transferred from axle shafts to the first and second traction motor-generators where electrical energy is generated.

In any of the aspects or combinations of the aspects, when the motors are mounted on either side of the input shaft, the axle achieves increased packaging flexibility without affecting desired direction of rotation of transmission gears, direction of oil flow, and internal resultant forces on bearings.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein.

Note that the example control and estimation routines included herein can be used with various electric axle, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the electric drive unit and/or vehicle system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle comprising:
a first motor-generator removably coupled to a first side of an input shaft via a first mechanical attachment interface;
a second motor-generator removably coupled to a second mechanical interface on a second side of the input shaft;
a transmission including:
the input shaft; and
a clutch mounted on an intermediate shaft or the input shaft and configured to shift the transmission between at least two gear ratios;
a differential rotationally coupled to the transmission; and
a controller including:
instructions that when executed, during a first partial regeneration mode when a torque demand is greater than a threshold value, cause the controller to: operate the first motor-generator in a regeneration mode and the second motor-generator in a drive mode; and
instructions that when executed, during a second partial regeneration mode where the torque demand is less than the threshold value, cause the controller to: operate the second motor-generator in a regeneration mode and the first motor-generator in a drive mode;
wherein the first motor-generator and the input shaft are coaxially arranged;
wherein a rotational axis of a side gear in the differential is arranged parallel to the input shaft; and
wherein the first and second motor-generators have different torque capacities.

2. The electric axle of claim 1, wherein:
the controller includes instructions that when executed, during a full regeneration mode, cause the controller to:
operate the first motor-generator in the regeneration mode and operate the second motor-generator in the regeneration mode.

3. The electric axle of claim 2, wherein the first motor-generator has a higher torque capacity than the second motor-generator.

4. The electric axle of claim 3, wherein the partial regeneration mode is a mode where a torque demand for the transmission is below a threshold value.

5. The electric axle of claim 1, wherein the first and second mechanical attachment interfaces include splines.

6. The electric axle of claim 1, further comprising a controller including instructions that when executed, while the first motor-generator is shut down, cause the controller to:
shift the transmission into neutral via the clutch.

7. The electric axle of claim 1, wherein the transmission includes a gear fixedly coupled to the intermediate shaft and meshing with an input gear in the differential.

8. The electric axle of claim 1, wherein the transmission includes a first gear and a second gear fixedly coupled to the input shaft and meshing with a third gear and a fourth gear, respectively, that are idly mounted on the intermediate shaft.

9. The electric axle of claim 8, wherein the third gear and the fourth gear are idly mounted to the intermediate shaft via needle bearings.

10. The electric axle of claim 1, wherein the clutch is configured to shift the transmission between only two gear ratios.

11. The electric axle of claim 1, wherein the clutch is a synchronizer.

12. A method for operation of an electric axle, comprising:
in a first partial regeneration mode, operating a first electric motor-generator to transfer mechanical power to a multi-speed transmission and to a second electric motor-generator and operating the second electric motor-generator in a regeneration mode where the second electric motor-generator generates electrical energy; and
in a second partial regeneration mode, operating the second electric motor-generator to transfer mechanical power to the multi-speed transmission and to the first electric motor-generator and operating the first electric motor-generator in a regeneration mode where the first electric motor-generator generates electrical energy; and
wherein the first and second motor-generators and an input shaft in the multi-speed transmission are coaxially arranged; and
wherein the first and second motor-generators have different torque capacities, performance, and efficiency characteristics; and
wherein the electric axle includes:
a transmission including:
the input shaft; and
a clutch mounted on an intermediate shaft or the input shaft and configured to shift the transmission between at least two gear ratios; and
a differential rotationally coupled to the transmission.

13. The method of claim 12, further comprising, while the second electric motor-generator is operated in the regeneration mode, shifting the multi-speed transmission between a first gear ratio and a second gear ratio via operation a clutch mounted on an intermediate shaft or the input shaft.

14. The method of claim 12, further comprising shifting the multi-speed transmission into neutral via operation a clutch mounted on an intermediate shaft or the input shaft.

15. An electric axle comprising:
a first traction motor-generator directly and removably coupled to a first end of an input shaft;
a second traction motor-generator directly and removably coupled to a second end of the input shaft;
a multi-speed transmission including:
the input shaft; and
a clutch mounted on an intermediate shaft and configured to shift the multi-speed transmission between a first gear reduction and a second gear reduction;
a differential with an input gear that meshes with a gear on the intermediate shaft; and
a controller including:
instructions that when executed, during a first partial regeneration mode when a torque demand is greater than a threshold value, cause the controller to: operate the first traction motor-generator in a regeneration mode and the second traction motor-generator in a drive mode; and
instructions that when executed, during a second partial regeneration mode where the torque demand is less than the threshold value, cause the controller to: operate the second traction motor-generator in a regeneration mode and the first traction motor-generator in a drive mode;
wherein the first traction motor-generator has a higher torque capacity than the second traction motor-generator; and
wherein the first traction motor-generator, the second traction motor-generator, and the input shaft are coaxially arranged.

16. The electric axle of claim 15, wherein a rotational axis of a side gear in the differential is parallel to the input shaft.

17. The electric axle of claim 15, further comprising a controller including instructions that when executed, during braking and/or deceleration, cause the controller to:
operate both of the first traction motor-generator and the second traction motor-generator in a regeneration mode where mechanical power is transferred from axle shafts to the first and second traction motor-generators where electrical energy is generated.

18. The electric axle of claim 15, further comprising a controller including instructions that when executed, during a drive mode when a torque demand in the multi-speed transmission is below a threshold value, cause the controller to:
operate the first traction motor-generator in a regeneration mode where mechanical power is transferred from the second traction motor-generator to the first traction motor-generator and the first traction motor-generator generates electrical energy.

19. The electric axle of claim 18, wherein the controller further comprises: instructions that when executed, during a drive mode when a torque demand in the multi-speed transmission is above the threshold value, cause the controller to:
operate the second traction motor-generator in a regeneration mode where mechanical power is transferred from the first traction motor-generator to the second traction motor-generator and the second traction motor-generator generates electrical energy.

* * * * *